Nov. 1, 1949     D. G. C. HARE     2,486,944
RADIATION DETECTOR
Filed March 14, 1946
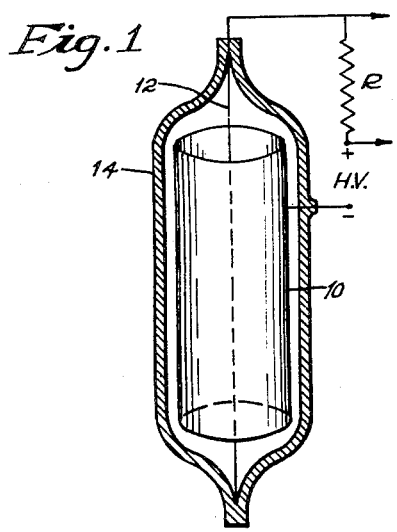
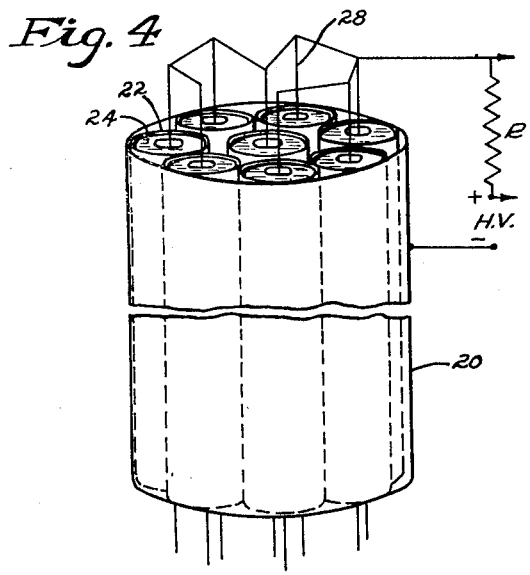
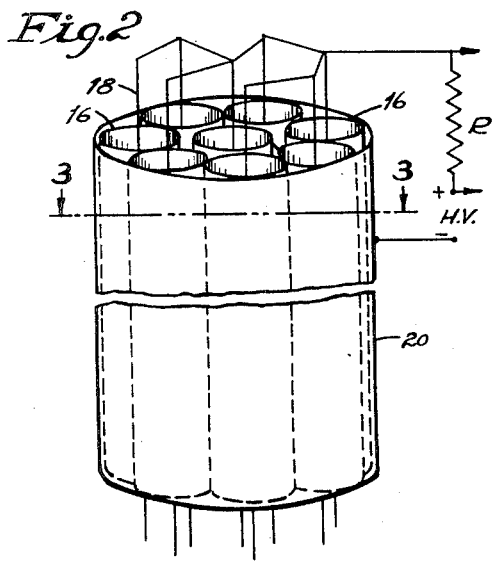
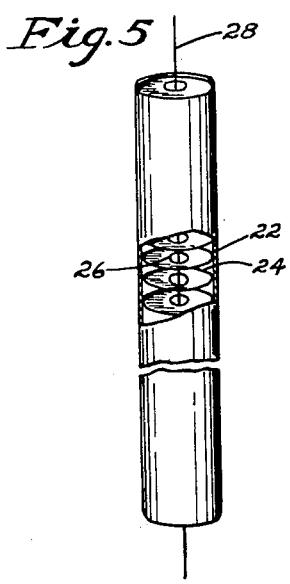
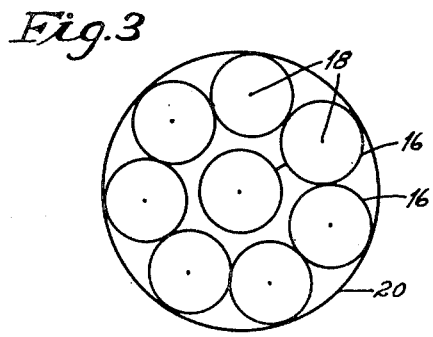
INVENTOR
D.G.C. HARE
BY
ATTORNEY Patented Nov. 1, 1949

2,486,944

UNITED STATES PATENT OFFICE 2,486,944

RADIATION DETECTOR

Donald G. C. Hare, Westport, Conn., assignor to The Texas Company, New York, N. Y., a corporation of Delaware Application March 14, 1946, Serial No. 654,272

2 Claims. (Cl. 250—27.5)

This invention relates to the detecting and measurement of penetrative radiation and more particularly to a device for measuring the intensity of such radiation as gamma rays.

The principal object of the invention is to provide a device of this type which will have an efficiency much higher than the ordinary or conventional Geiger-Mueller counter, which will be relatively simple to manufacture and which will be particularly adaptable for use in the logging of wells or bore holes.

This application is a continuation-in-part of my co-pending application filed September 27, 1941, Serial No. 412,617, now U. S. Letters No. 2,397,071, granted March 19, 1946, in which there is disclosed a device for the detecting of penetrative radiation, such as gamma rays, which device has an efficiency many times that of the radiation detecting devices known to the prior art. In that patent a radiation detector of the counter type is disclosed, in which the cathode comprises a plurality of thin sheets or plates arranged in parallel separated relation, the bank of plates being provided with one or more series of aligned holes with an anode wire disposed through each series of holes on the longitudinal axis thereof.

In accordance with the present invention a radiation detecting device of the counter type is formed of a plurality or bundle of small counters arranged in closely adjacent, parallel relation, each counter having a cathode and an anode and the bundle of counters being disposed in an envelope or housing containing a gaseous filling. In one embodiment, the counters are of the Geiger-Mueller type, each having a cylindrical or tubular cathode and an anode wire stretched along the longitudinal axis thereof. In another embodiment, each counter is of the type disclosed in the aforementioned patent and comprises a plurality of small cathode plates arranged in parallel separated relation, laterally within a tubular supporting member and each cathode plate being provided with at least one hole. An anode wire is disposed along the longitudinal axis of each of the series of holes in the cathode plates. In both embodiments the gaseous filling is common to all of the individual counters.

For a better understanding of the invention reference may be had to the accompanying drawing in which:

Figure 1 is a diagrammatic view of a Geiger-Mueller counter of the more or less conventional type;

Figure 2 shows one arrangement of a group or bundle of conventional counters;

Figure 3 is a sectional view on the line 3—3 of Figure 2;

Figure 4 is a view similar to Figure 2 showing a bundle of counters of a different type and Figure 5 is a view with parts broken away showing one of the counters used in the embodiment of Figure 4.

The conventional Geiger-Mueller counter shown in Fig. 1 consists of a thin-walled tube 10 with a very thin wire, comprising the anode 12, spanned axially and insulated from the metal tube forming the cathode. These electrodes are enclosed in an envelope 14, commonly a glass tube, which contains a suitable gas, e. g., argon, at a fairly low pressure, say 5–10 cm. of mercury. The central wire 12 is maintained at a positive potential with respect to the cylinder, and a fairly high resistance R is placed in the circuit. Normally the potential difference between the cathode 10 and wire 12 is nearly but not quite high enough to cause an electrical discharge to take place. If a ray or particle capable of ionizing the gas passes through the cylinder 10, a discharge will take place with a current flow of the order of a few microamperes. This causes a large voltage drop across R and the discharge will cease after a very short period of time. By suitably amplifying the sudden voltage drop or pulse across R, a mechanical recorder or other device capable of registering the discharges of the counter may be actuated. Suitable treatment of the surface of the cylinder 10 and proper choice of the gas or gases filling the counter will cause the discharge to stop more quickly and reliably. After the discharge has ceased, the counter is again in a condition to register the passage of an ionizing particle or ray.

Because of the large ionization per unit path length of such radiation as cosmic or beta rays, even in the relatively low density of the gas in the counter, the efficiency of the conventional counter for such rays is very nearly 100%. However, the probability of a gamma ray causing ionization in the gas is almost vanishingly small, and practically all the counts due to the passage of gamma rays are due to the electrons ejected from the cathode wall 10 by the interaction of the gamma ray with the atoms of the cathode material. The probability of such an interaction taking place will, of course, increase with increasing cathode-wall thickness, but since the range in the cathode material of an electron receiving energy from the gamma ray is seldom greater than a small fraction of a millimeter, nothing is to be gained by making the wall 18 thicker than about twice the average range of the electrons. At this thickness about one out of every one hundred gamma rays traversing the cathode will eject an electron so as to "trigger" or discharge the counter. This probability or efficiency is somewhat dependent on the material used as the cathode 10 and on the amount of surface exposed, but all these factors will not cause any variation of efficiency by more than a factor of about two from that of a simple counter with the optimum wall thickness. It is to be pointed out that the efficiency is practically independent of the size of the counter, a very small counter having nearly the same optimum efficiency as a very large one.

We define the efficiency of a counter as the ratio of the number of counts to the number of rays traversing the cathode area. For a parallel beam of gamma rays one can increase this ratio by using several counters, one behind the other and connected in parallel. If we have N counters, each with an efficiency E, the efficiency of the combination would be nearly NE. However, a parallel beam of gamma rays is a practical impossibility and does not occur in nature.

In Figures 2 and 3 is shown one embodiment of the present invention in which a plurality of small detectors or counters of the type shown in Figure 1 is arranged in a parallel bank or bundle. In these figures a bundle of eight small counters having cathodes 16 and anodes 18 is arranged within an envelope or housing 20. The metal cathode tubes or cylinders 16 are connected together electrically to form the cathode hole and the wires 18 are connected electrically to form the anode of the device. If the enclosing cylinder or housing 20 is of metal the electrical connection to the cathode can be made directly to the housing, as shown. By providing upper and lower cover members for the cylinder 20 and filling the housing thus provided with a suitable gas, no other housing will be needed. If desired, the cylinder 20 with its open top and bottom can be placed within a separate envelope or housing corresponding to the envelope 14 of Fig. 1 which can be sealed to contain the gaseous filling. By utilizing a plurality of small counters in the manner described, a considerable gain in efficiency will be obtained when compared with a single larger counter having the same lateral cross section. For example, assuming a lateral cross section of 3 inches and the use of 7 counters each 1 inch in diameter, one would obtain an increase in efficiency by a factor of about seven-thirds. By utilizing a greater number of counters of smaller diameter and arranged to occupy the same volume as the detector just described, a still greater increase in efficiency will be obtained. Thus, by using a large number of small counters, each having a cathode cylinder less than 1 millimeter in thickness, a comparatively large matter path for the gamma ray with a short path for the ejected electron will result. Another advantage of a detector of this type lies in the fact that if, for some reason one of the small counters should cease functioning, for instance, during a well logging operation, the remaining detectors would still function and a log of the hole could still be obtained.

In the embodiment shown in Figures 4 and 5 of the drawing a plurality or bundle of small counters is arranged in a manner similar to that described with reference to Fig. 2, but in which each of the counters is of the general type described in the aforementioned patent No. 2,397,071. Thus, each counter comprises a thin-walled metal cylinder or tube 22 within which is arranged in parallel, separated relation a plurality of thin cathode sheets or plates 24, each containing a hole 26. An anode 28 is stretched along the longitudinal axis of the series of holes 26. As has been described with reference to the embodiment of Figure 2 the bundle of small counters is preferably housed within a metal envelope or casing 20 to which the cathode electrical connection is made. The anode wires 28 are connected together electrically as shown in Figure 4. As is the case with the detector shown in Figure 2 the envelope or casing 20 can be provided with upper and lower cover members so that the gas filling can be sealed within the device, the gas filling being common to all of the counters in the bundle. The device as shown in Figure 4 may be placed within a housing as has been previously described.

Instead of providing each of the separate counters shown in Figure 5 with one series of aligned holes, each of the cathode plates 24 may be provided with a plurality of holes and the plates arranged within the cylinder 22 so that the holes will be aligned, in which case each small counter will be provided with a number of anode wires, one passing through each series of aligned holes as described in the aforementioned Patent No. 2,397,071.

For purpose of simplicity, diagrammatic illustrations of the elements have been used.

It is understood that the length of the detector will be chosen to suit the particular application. Thus, in the logging of wells or bore holes where a detector is passed through the hole to measure natural or induced gamma radiation of the surrounding formation, a detector having a lateral cross section of around 3" and a length of from say, 10" or 12" to 3' or 4', or more, can be used. If desired, several detectors each, say 10" in length can be arranged end to end, where a longer instrument is desired. In other applications the detector housing may be shorter in length but considerably larger in its lateral dimension and in such a case it is, of course, possible to use a larger number of counters arranged in the group or bundle.

Obviously many modifications and variations of the invention, as hereinbefore set forth, may be made without departing from the spirit and scope thereof, and therefore, only such limitations should be imposed as are indicated in the appended claims.

I claim:

1. A detector of gamma rays comprising a gas-filled chamber, a bundle of gamma ray counters in said chamber, said counters being arranged in closely adjacent, parallel relation and substantially coextensive in length, each of said counters comprising a metallic tubular member, a plurality of thin metallic plates disposed in parallel, separated relation substantially laterally within said member to form a cathode bank, each of said plates being provided with at least one hole and the holes in the plates being disposed in an aligned series, and an anode wire disposed along the longitudinal axis of each series of holes, the plates and tubular members of the individual counters being connected together electrically to form the cathode of the detector.

2. A detector of gamma rays comprising a gas-filled chamber, a bundle of gamma ray counters in said chamber, said counters being arranged in closely adjacent, parallel relation and substantially coextensive in length, each of said counters comprising a metallic tubular member, a plurality of thin metallic plates disposed laterally within said member in parallel separated relation to form a cathode bank, each of said plates being provided with at least one hole and the holes in the plates being disposed in an aligned series, the separation between said plates being not greater than the diameter of said holes, and an anode wire disposed along the longitudinal axis of each series of holes, the plates and tubular members of the individual counters being connected together electrically to form the cathode of the detector.

DONALD G. C. HARE.

REFERENCES CITED

The following references are of record in the file of this patent:

FOREIGN PATENTS

| Number | Country | Date |
|---|---|---|
| 690,411 | Germany | Apr. 24, 1940 |